July 12, 1960

A. C. PATIN ET AL 2,944,770

AIRCRAFT CONTROL SYSTEM

Filed Aug. 4, 1954

CURVES OF RELATIVE ELEVATOR DEFLECTION REQUIRED TO PRODUCE CONSTANT AIRFRAME STRESSES AT SEA LEVEL AS A FUNCTION OF MACH NUMBER

Inventors
Albert C. Patin
Werner T. Massmann
By Schroeder, Hofgren, Brady & Wegner
Attorneys

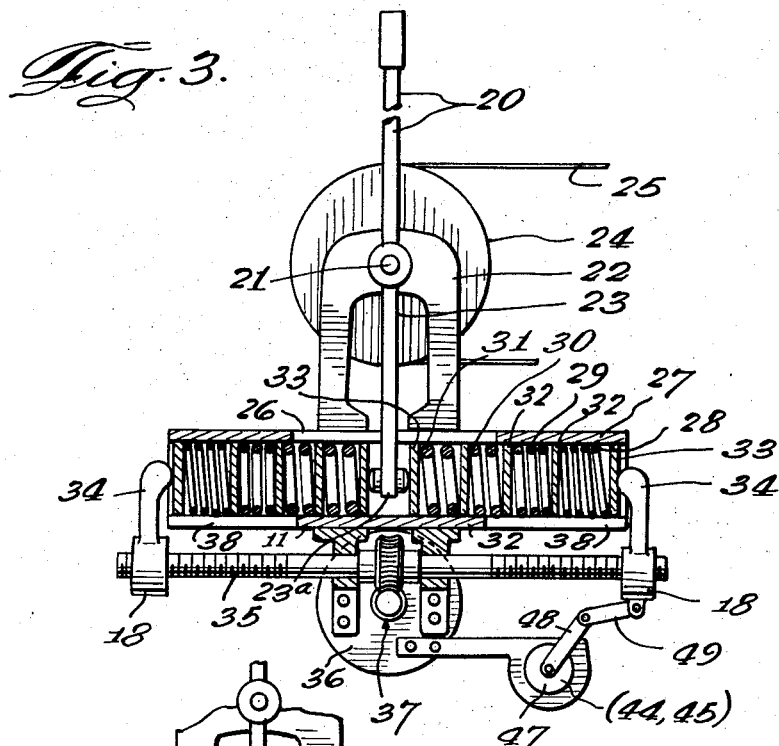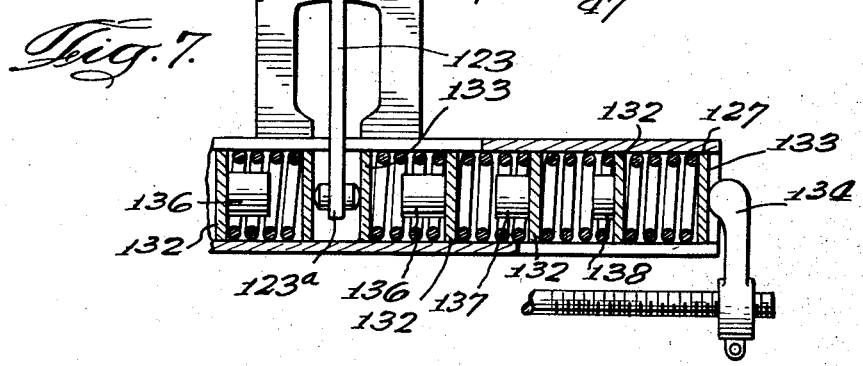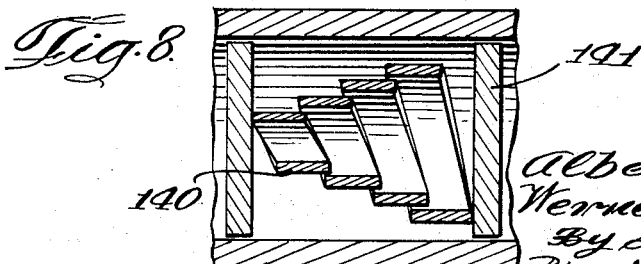

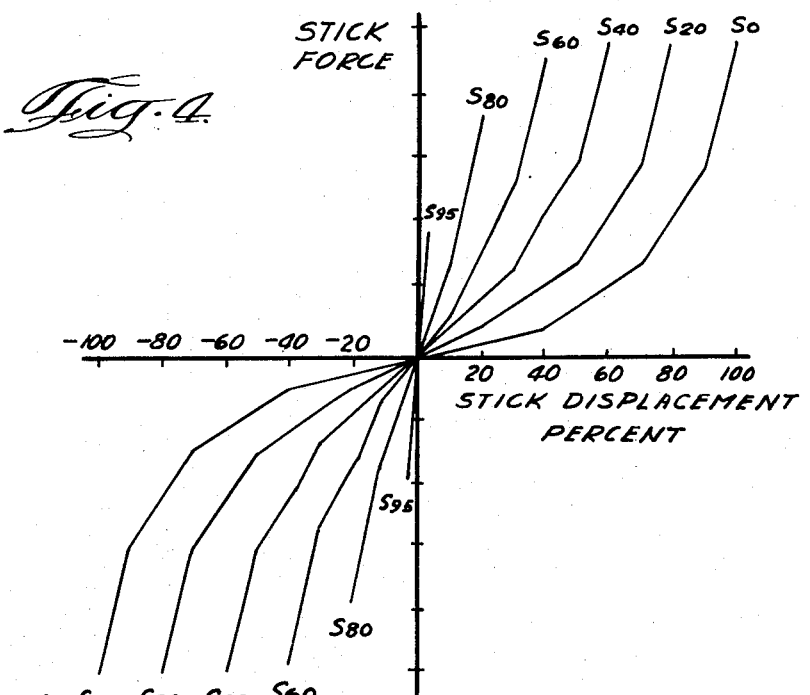
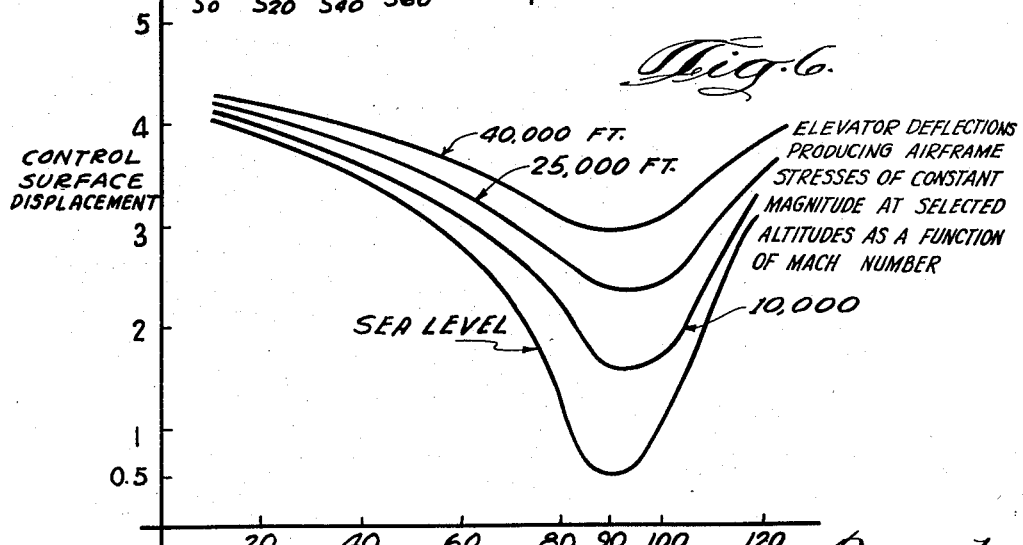

July 12, 1960

A. C. PATIN ET AL 2,944,770

AIRCRAFT CONTROL SYSTEM

Filed Aug. 4, 1954

Inventors
Albert C. Patin
Werner G. Massmann
By Schroeder, Hofgren, Brady & Wegner
Attorneys 2,944,770
Patented July 12, 1960

2,944,770

AIRCRAFT CONTROL SYSTEM

Albert C. Patin and Werner F. Massmann, Lemont, Ill., assignors to Ampatco Laboratories Corporation, a corporation of Delaware Filed Aug. 4, 1954, Ser. No. 447,796

2 Claims. (Cl. 244—83)

This invention relates to an aircraft control system and more particularly to a system for affecting and limiting the pilot control of an aircraft under certain conditions.

The effect of a given movement of an aircraft control surface on the attitude of the aircraft may vary considerably depending on certain conditions such as the speed and altitude at which the aircraft is operated. This is particularly true in many present day aircraft which operate at speeds near or above the speed of sound. Under certain conditions it may be possible to put the aircraft inadvertently into an attitude or through a maneuver which will cause damage to the airplane and which might result in tearing it apart.

It is a principal feature of this invention that it provides a control system in which positive restraining means are provided for preventing the pilot from operating the aircraft in such a manner that it may be damaged and further that the force required to be applied by the pilot to the control surface operating element to cause a given change in the aircraft attitude is maintained substantially constant regardless of the conditions under which the aircraft is operated.

Another feature is that in an aircraft having a control surface, a movable operating element and means for effecting operating of the control surface in response to the movement of the operating element, apparatus is provided comprising means for sensing a condition of the aircraft which determines the effectiveness of the control surface and means responsive to the condition sensing means for preventing movement of the control surface which might injure the aircraft. A further feature is that the conditions sensed are the Mach number and altitude of the aircraft.

Yet another feature is the provision, in an aircraft of the type described above and having power means for effecting operation of the control surface in response to movement of the operating element, of means for sensing a condition of the aircraft which determines the effectiveness of the control surface, means for providing a variable restraining force on the operating element and means responsive to the sensing means for varying the restraining force applied to the control element as a function of the effectiveness of the control surface and for limiting movement of the control surface which might injure the aircraft.

A further feature is the provision, in the system above described, of adjustable bias means associated with the operating element, adjustable stop means associated with the operating element and means responsive to the sensing means for adjusting the bias means to maintain a desired relation between the force applied to the operating element and the effect of the control surface and for adjusting the stop means to prevent movement of the control surface which might injure the aircraft. Yet another feature is that the adjustable bias means comprise a pair of elongated, progressive spring assemblies arranged in opposed relationship and engaging a portion of the operating element.

Further features and advantages will readily be apparent from the following specification and from the drawings, in which:

Fig. 3 is an elevation view, partially in section, of an embodiment of the invention;

Fig. 4 is a chart illustrating the operation of the invention;

Fig. 6 is a chart showing a family of curves illustrating the effectiveness of an aircraft control surface in terms of the altitude of the aircraft;

Fig. 7 is a fragmentary sectional view of a modified form of the invention;

Fig. 8 is a fragmentary sectional view of another modified form of the invention;

The control of a pilot over the flight of an aircraft, that is, over the attitude at which the aircraft flies and the maneuvers which it performs are primarily determined by the control surfaces of the aircraft, namely the elevators, rudder and ailerons. The position of these control surfaces may be changed, to effect changes in the attitude of the aircraft, by means of manually movable operating elements, such as a stick or wheel and pedals. Under most normally encountered operating conditions, the effectiveness of a control surface is directly proportional to the square of the air speed. Similarly, the force necessary on the operating element to cause a given deflection of a control surface is directly proportional to the square of the air speed. Accordingly, to cause a desired change in the attitude of the aircraft, as to cause it to climb at a given angle, the pilot will move the operating element with the same force regardless of the air speed. Thus, experienced pilots fly primarily by the force used in moving the control element rather than the displacement thereof.

In many types of modern aircraft, and particularly in large, high speed aircraft, the force necessary to cause the desired deflection of a control surface exceeds the physical strength of the pilot. As a result it has become necessary to provide a power control system for at least some if not all the control surfaces of such aircraft (see Kleinhans Patent 2,395,671 for further details of such a system). Various types of power control systems are available, some being of the boost or force amplifier type in which there is a proportional relationship between the operating element force and the force ultimately applied to the control surface and others providing full power control which require substantially no force on the operating element.

It is difficult for a pilot to control an aircraft properly unless there is some force opposing the operating element movement and artificial "feel" systems are known which are intended to provide such a force. Simple spring arrangements for restraining movement of the operating element are widely used and elaborate hydraulic systems have been designed to provide an accurate simulation of the force on the control surface. With any known "feel" system, however, it is possible for the pilot to apply an excessive amount of force and overcome the artificial "feel" system.

It has been discovered that at certain speeds, particularly in the sonic region, conditions are established under which this ability of a pilot to over-control the aircraft may be dangerous.

Figure 1:
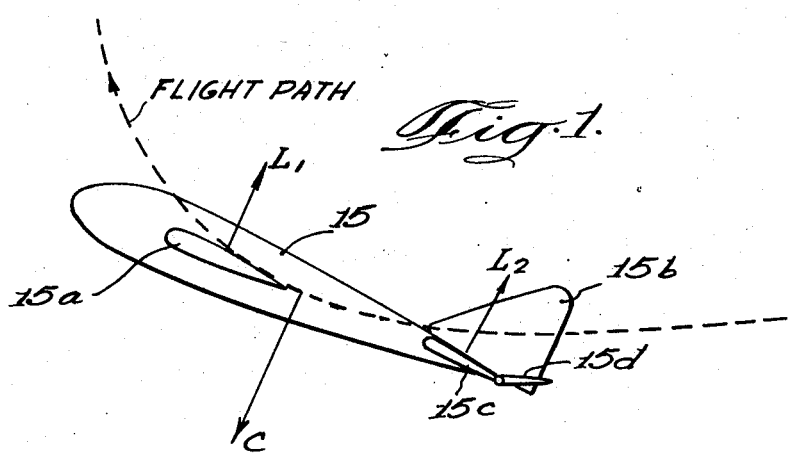
Fig. 1 is a diagrammatic view showing the major forces acting on an aircraft.

Consider, for example, the diagram of Fig. 1 where an aircraft 15 having a wing 15a, rudder 15b and stabilizer 15c provided with movable elevator control surface 15d is shown. When the elevator is moved upwardly, as shown in the drawing, the aircraft will climb as shown by the broken line flight path. A centrifugal force C, acting as shown in the drawing, results from the curved motion of the aircraft. Opposed to the centrifugal force C are two aerodynamic lift forces L1 and L2 acting on the wing 15a and stabilizer 15c respectively. The magnitude of these various forces depends on the speed of the aircraft, the amount of elevator deflection and the relative elevator effectiveness. If the elevators are deflected through a certain angle at the speed where the control surface effectiveness is relatively small, the resulting centrifugal force C is less than it would be if the same deflection were made at a speed where the effectiveness is relatively great.

It will be noted from an examination of Fig. 1 that the three forces, C, L1 and L2 are so positioned that they place a substantial stress on the frame of the aircraft. It is therefore necessary to prevent these forces from becoming large enough to cause injury to the aircraft or, to so construct the aircraft that under no conceivable conditions could these forces become great enough to cause injury. The latter solution is rather impractical as it would require the construction of an undesirably, if not prohibitively, heavy aircraft.

Figure 2:
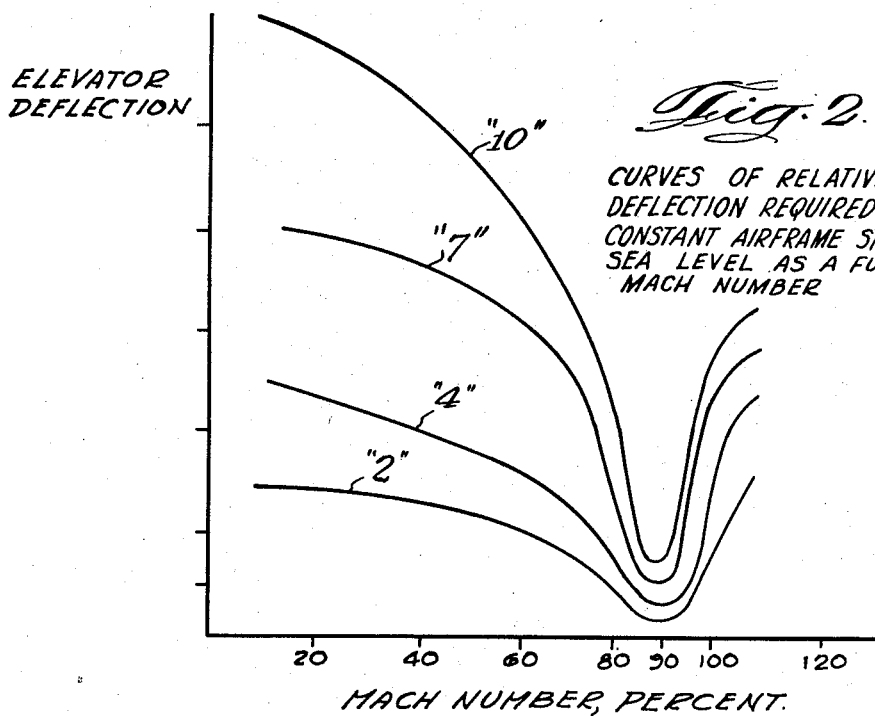
Fig. 2 is a chart showing a family of curves illustrating the effectiveness of an aircraft control surface in terms of the aircraft speed.

It has been mentioned briefly that the effectiveness of the control surfaces of the aircraft becomes quite high at or about the speed of sound. This condition is illustrated in the chart of Fig. 2 where curves of constant airframe stress are plotted in terms of the elevator deflection and the aircraft speed expressed in percent of Mach number, where Mach 100 equals the speed of sound. (The curves and values given on this chart, and on other charts illustrated herein, are not intended to represent any particular aircraft or other physical system, unless noted otherwise, but are given only as qualitative representations of the principles involved.) The numbers 2, 4, 7 and 10 associated with the curves of Fig. 2 indicate that the stress on the airframe is, respectively, 2, 4, 7 and 10 times that experienced in straight and level flight. Accordingly, if the airframe of the aircraft in question is so designed that it can withstand a stress corresponding to curve 7, the operation of the elevator in relation to the Mach number must be so limited that the stress 7 curve is not exceeded. It is apparent from Fig. 2 that the control of the elevator in the area between 80% and 100% Mach is exceedingly critical and that a slight amount of over control in this area can be quite dangerous.

While, as has been mentioned, systems have been known for providing artificial feel on control surface operating elements, pilots sometimes inadvertently overcome these systems by the application of excessive forces on the operating element with the result that the airframe may be overstressed. In some instances the tail assembly is actually torn off the plane.

The system shown in Fig. 3 provides a means for positively limiting the movement of the control surface operating element in addition to providing an improved artificial feel. A stick-type operating element 20 (representative of any pilot-operated element, as a wheel-type operating element and rudder pedals) is pivotally mounted at 21 on a bracket 22 and has an arm portion 23 extending downwardly therefrom. A pulley 24 is secured to the stick and cable 25 passes thereover to transmit the stick motion to the control surface, as through a power amplifier system (not shown).

The lower end 23a of arm portion 23 extends into a longitudinal slot 26 formed in the elongated cylindrical casing 27, extending on either side of the stick. Arranged within the housing 27, one on either side of the lower end 23a of the arm, are a pair of progressive spring systems each made up of springs 28, 29, 30 and 31 separated by spacer plates 32. End plates 33 are provided at the ends of the spring systems. The meaning of the term "progressive spring system" will become apparent as the description proceeds. The innermost end plates bear against the lower end of arm 23 while the outer end plates are held in place by movable studs 34.

The different springs 28, 29, 30 and 31 are each of a different strength as indicated by the differences in wire diameter and number of turns, however the assemblies on either side of the stick are identical. As the stick 20 is moved in one direction or the other the springs against which the lower end of arm 23 is moved will all be compressed simultaneously. The weakest spring, 28, will however be compressed completely with a relatively short movement of the control and a stronger force will then be required to continue compression of the remaining springs as the system spring constant will be greater. This action continues as the operating element 20 is moved, with the force required becoming progressively greater, until all of the springs have been completely depressed at which time further movement of the operating element will be positively prevented, the compressed springs forming a rigid stop.

The two spring assemblies may be given any desired amount of preload by moving inwardly the studs 34 which are mounted on reversely threaded end portions of screw 35. A spring bias control motor 36 is provided with drive screw 35 through a worm and gear arrangement 37. Slots 38 are cut in the spring assembly housing 27 to permit passage of studs 34.

The effect of the progressive spring bias arrangement on the relationship between the force applied to the stick and the resulting stick displacement is shown graphically in Fig. 4. The stick displacement percentages are referred to the maximum permissible stick displacement and the stick force is shown in arbitrary units. The various curves $S_0$, $S_{20}$, $S_{40}$, $S_{60}$, $S_{80}$, $S_{95}$ represent the percent of preload placed on the progressive spring assemblies by the studs 34. Thus, for example, curve $S_0$ illustrates the situation where there is no preload; curve $S_{40}$ illustrates the situation with a preload corresponding to 40% of the stick displacement; and curve $S_{95}$ corresponds to a preload of 95% of the permissible stick displacement. By varying the amount of preload applied to the progressive spring assemblies, the force necessary to provide a given stick displacement, and thus a given control surface deflection, may be readily varied; and in addition, the maximum permissible stick displacement, indicated by the ends of the various curves, may be positively controlled. The family of curves shown in Fig. 4 represents a spring system in which the constants of the springs are related in the ratio of 1 to 2.7 to 6 to 16; and in which, starting from a position in which all the springs are fully expanded, the first spring reaches its limit at 40% of the stick displacement, the second at 70%, the third at 90% and the fourth at 100%.

The progressive spring system just described is particularly advantageous in that it is extremely versatile. The number of possible spring combinations which may be devised is practically infinite and any desired combination of characteristics may be provided to fit the particular situation.

Figure 5:
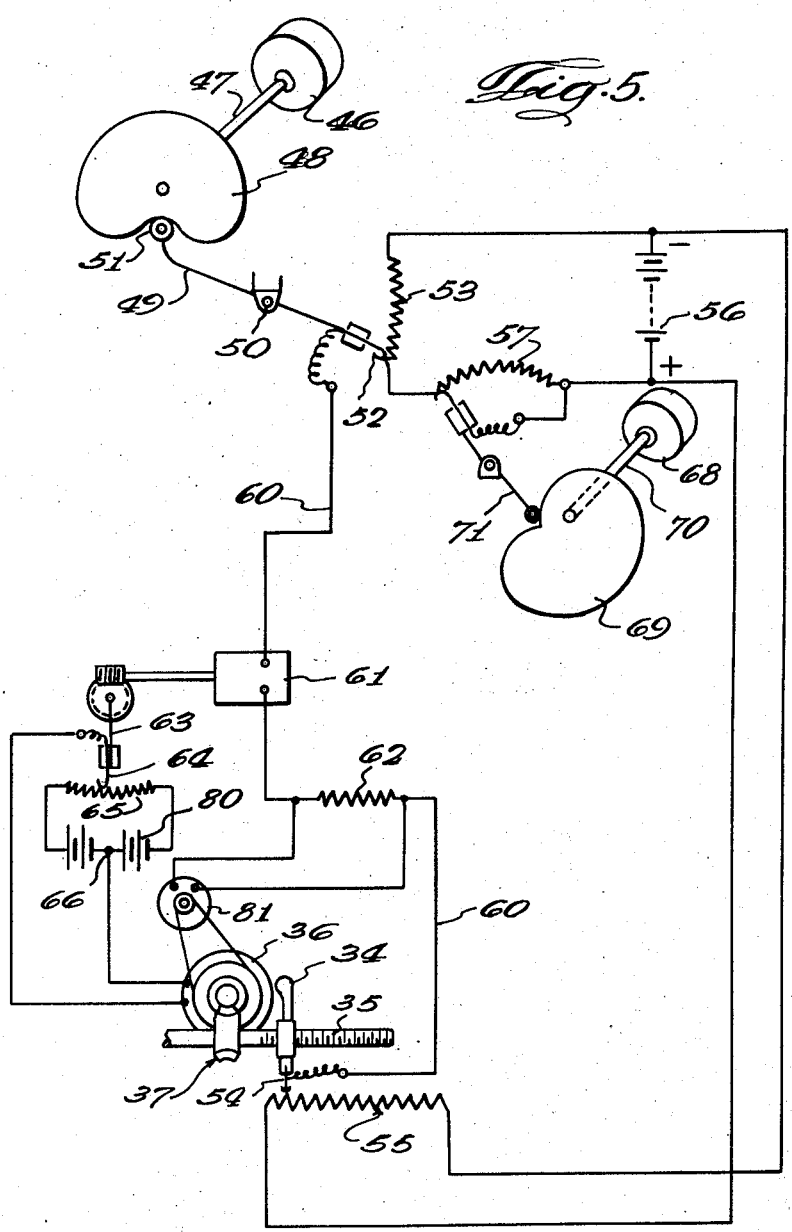
Fig. 5 is a schematic diagram of a control system used with the invention.

Referring now to Fig. 5, an electrical control system for effecting the proper positioning of studs 34 will be described. A Mach number meter 46 has an output shaft 47 whose displacement is a function of the Mach number of the aircraft. Secured to shaft 47 is a cam 48 shaped in accordance with one of the curves shown in Fig. 2. If we assume that the airframe of the aircraft is incapable of withstanding stresses higher than those occurring along curve "7," the cam 38 will be designed from this curve.

A lever arm 49 is pivotally mounted at a point 50 intermediate its ends and is provided at one end with a roller 51 which engages the surface of cam 48. The other end of lever 49 carries a wiper 52 in electrical contact with a potentiometer 53.

Mounted on one of the studs 34 is a similar wiper 54 in electrical contact with potentiometer 55 which is connected in parallel with potentiometer 53 to a suitable D.C. source, 56. (Resistor 57 may be considered short circuited for the time being.)

Wipers 52 and 54 are connected together by a lead 60 including a series therein a motor 61 and a resistor 62. A current will flow through the lead 60 whenever the wipers contact the respective potentiometers at points of different potential. The system is so arranged that when wipers 52 and 54 are positioned at points of equal potential studs 34 will apply the necessary preload to the progressive spring assemblies to compensate properly for the Mach speed of the aircraft, providing simultaneously a positive stop, to prevent over-control and damage to the aircraft, and the desired artificial feel.

Whenever a current flows through lead 60 the motor 61 will move arm 63 carrying a wiper 64 along potentiometer 65 in a direction determined by the polarity of the current. Wiper 64 and the center point 66 of a D.C. source 80 are connected to the spring bias control motor 36. The system is at rest when wipers 52 and 54 are positioned at points of the same potential on their respective potentiometers and wiper 64 is in the center of potentiometer 65. A displacement of wiper 52, resulting from a change in Mach number, starts motor 61 which, by displacing wiper 64, causes motor 36 to readjust the position of studs 34. The system should come to rest again when the studs arrive at a point where wiper 34 has the same potential as wiper 52. This is impossible, however, without further provision since it requires a current in the opposite direction in lead 60 to turn wiper 64 back to its neutral position. Such a current in lead 60 can flow only if wiper 54 overshoots the current position, causing the system to hunt. This undesired operation may be eliminated by providing a velocity or tachometric feedback.

For this purpose a generator 81 is driven by motor 36, producing a voltage proportional to the speed of motor 36. Generator 81 is connected across resistor 62 in lead 60, the polarity being such that the generator voltage is opposed to the current flow resulting from a displacement of wiper 52. The feedback may be properly adjusted to eliminate hunting in the system by the proper selection of the value for resistor 62.

One other factor which has not been mentioned must be taken into account. The effectiveness of the control surfaces of the aircraft is determined not only by the speed of the aircraft but also by the altitude at which it is operating. This is illustrated graphically in the curves of Fig. 6 where a family of four curves of constant airframe stress, as the curve "7" of Fig. 2, are plotted for various altitudes in terms of the percent of Mach number and the displacement of the control surface (in arbitrary units.) (The curves of Fig. 2 are plotted for the conditions obtaining at sea level.) These show that as altitude increases, the control surfaces may be displaced further without subjecting the airframe to excessive stress. It will thus be seen that if the system is designed to compensate for variations in speed at sea level, it will greatly overcompensate at higher altitudes preventing the pilot from obtaining the maximum safe control operation of his aircraft.

Accordingly, an altimeter 68 is provided which drives a cam 69 secured to its output shaft 70. A lever 71 is moved by cam 69 to short out a variable portion of resistance 57 in accordance with the altitude of the aircraft. The system is arranged so that at sea level, potentiometer 57 is completely shorted out applying the full potential of source 56 to potentiometer 53. However, as the aircraft gains altitude more and more resistor 57 is added to the circuit, reducing the potential appearing across potentiometer 53, but not affecting the potential applied to potentiometer 55. As a result the preload placed on the progressive spring assemblies at a given Mach number is decreased with an increase in altitude. Cam 69 is shaped in accordance with the curves of Fig. 6 to permit maximum utilization of the aircraft capability at all altitudes. (Neither cam 48 nor cam 69 is to be considered as shown in anything but an illustrative shape, as its true shape for a given aircraft can be determined only by means of very lengthy calculations.)

A modified progressive spring arrangement is shown in Fig. 7 wherein elements corresponding to elements previously described in connection with Fig. 3 will be given reference numerals 100 higher. Lower arm 123 of the control stick has an end portion 123a which extends into housing 127 through a slot 126 therein. A plurality of springs 135 of equal axial length and the same spring constant are arranged in the housing 127 as before. Here, however, the intermediate plates 132 are provided with centrally located bosses 136, 137 and 138, the bosses differing in length. As the springs are compressed, either by movement of the stick or by a preload resulting from movement of stud 134, the longest extension 136 will first engage the opposite end plate 133, eliminating the spring 135 associated therewith. As a result only the three remaining springs will be operative and the force per unit deflection of the stick will be increased correspondingly. Similarly, further movement of the stick or stud will eliminate the remainder of the springs as discussed in connection with Fig. 3. If desired, springs of different characteristics may be provided in the arrangement of Fig. 7.

Fig. 8 shows a cone-type spring 140 which might be substituted for the spring assemblies of Fig. 3 or Fig. 7 to obtain the desired progressive spring action. As the force applied to spring 140 is increased, more and more of the spring rests on lower plate 141, progressively increasing the spring stiffness. When the spring has been completely compressed it affords a positive stop.

Figure 9:
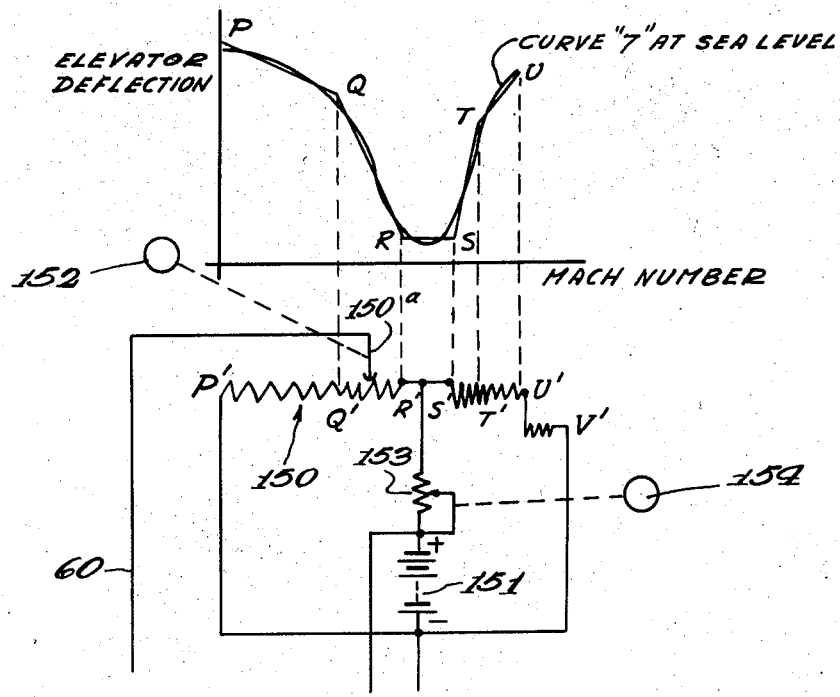
Fig. 9 is a fragmentary schematic view of a portion of a modified control circuit.

Figure 9 illustrates a portion of a modified control circuit in which the cam 48 associated with Mach meter 46 is eliminated by providing a specially wound potentiometer 150 in place of potentiometer 53. As indicated in the upper portion of Figure 9, the curve "7" at sea level (from Figure 2) may be approximated by five straight lines PQ, QR, RS, ST and TU. The potentiometer 150 is wound to have a resistance which conforms with the slope of straight lines approximating the curve, thus section P'Q' of the potentiometer corresponds to section PQ. The next section Q'R' of the potentiometer has a higher resistance per unit length than section P'Q' corresponding to the greater slope of line QR. The third section of the curve RS has zero slope and is represented in the potentiometer by a non-resistive conductor R'S'. Similarly sections S'T' and T'U' of the potentiometer correspond to portions ST and TU of the curve.

The D.C. source 151 is connected between the portion R'S' and both ends P' and U' of the potentiometer, providing a reversal of the polarity between the left hand and right hand portions of the potentiometer corresponding to the reversal of the slope of the curve.

In order to represent correctly the fact that the point P of the curve is higher than the point U, a series dropping resistor U'V' is connected to the right hand side of the potentiometer so that the point U' has a lower potential than the point P'.

Wiper 150a is moved along potentiometer 150 in accordance with the Mach speed of the aircraft, as determined by Mach meter 152. Variable resistor 153 which is connected in series with D.C. source 151 may be controlled by a cam associated with an altimeter 154, as described in connection with Fig. 5 or may be replaced with a special wound potentiometer designed, as discussed above, in accordance with the curves of Fig. 6. The remainder of the control system may be the same as that shown in Fig. 5 and previously described with wiper 150a connected to lead 60 and potentiometer 55 connected across the source.

Figure 10:
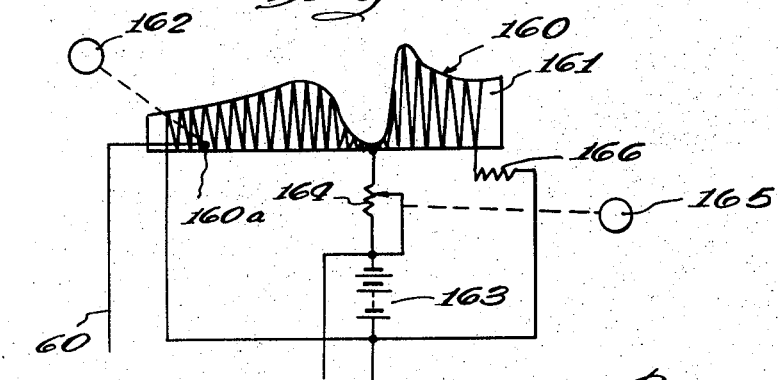
Fig. 10 is a fragmentary schematic view of another modified form of the control circuit.

Figure 10 illustrates another modificatiton by virtue of which the curve shown in Fig. 9 may be very accurately simulated. Here, the potentiometer 160 is wound on a form 161 which is shaped in such a way that the length of each turn of the potentiometer wire varies in accordance with the slope of the curve being simulated; that is, the contour of the form 161 is a function of the derivative of the curve being simulated. Again, the wiper 160a is moved along the potentiometer 160 by Mach meter 162. The D.C. source 163 is connected between the portion of the potentiometer 160 representing the point of slope reversal of the curve, and each end of the potentiometer through altitude compensating resistor 164, the resistance of which is controlled by altimeter 165. Series resistance 166, connected to the right hand end of potentiometer 160 corresponds to portion U'V' of the potentiometer of Fig. 9 and corrects for the difference in amplitude of points P and U of the curve. The potentiometer of Fig. 10 may be substituted in the control circuit of Fig. 5 as described in connection with Fig. 9.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In an aircraft having a control surface, a movable operating element, means for effecting operation of said control surface in response to movement of said operating element, and means for sensing conditions of said aircraft which determine the effectiveness of said control surface, means of the character described, comprising: a progressive, resilient bias arrangement for said control element comprising a pair of elongated spring assemblies in opposed contact with said operating element, each spring assembly including at least two springs of different strength; and means for adjustably compressing said spring assemblies in response to said sensing means for maintaining a desired relation between the force applied to said operating element and the effect of said control surface.

2. In an aircraft having an operating element and a control surface responsive to movement of said operating element, a feel system of the character described, comprising: an adjustable, progressive spring mechanism having a varying spring constant associated with said operating element for applying a bias thereto; and means, responsive to a condition of the aircraft, for adjusting said spring mechanism whereby the force required on the operating element of the aircraft to cause the execution of a desired maneuver is the same regardless of the condition of the aircraft.

References Cited in the file of this patent

UNITED STATES PATENTS

| | | |
|---|---|---|
| 2,508,883 | Knowler et al. | May 23, 1950 |
| 2,673,048 | Smith et al. | Mar. 23, 1954 |
| 2,695,145 | Lear et al. | Nov. 23, 1954 |

FOREIGN PATENTS

| | | |
|---|---|---|
| 570,030 | Great Britain | Nov. 9, 1944 |